United States Patent
Fresko

(10) Patent No.: US 7,421,707 B2
(45) Date of Patent: Sep. 2, 2008

(54) SYSTEM AND METHOD FOR INDUCING ASYNCHRONOUS BEHAVIORAL CHANGES IN A MANAGED APPLICATION PROCESS

(75) Inventor: Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 926 days.

(21) Appl. No.: 10/745,019

(22) Filed: Dec. 22, 2003

(65) Prior Publication Data

US 2005/0138640 A1 Jun. 23, 2005

(51) Int. Cl.
*G06F 9/00* (2006.01)
(52) U.S. Cl. .................. 719/320; 718/100; 717/116; 715/700
(58) Field of Classification Search ............. 719/320, 719/313, 315, 318; 715/760–763, 700; 718/100; 717/116
See application file for complete search history.

(56) References Cited

U.S. PATENT DOCUMENTS

| | | | | |
|---|---|---|---|---|
| 6,263,360 B1 * | 7/2001 | Arnold et al. | ............... | 709/203 |
| 6,266,716 B1 | 7/2001 | Wilson et al. | ................ | 710/33 |
| 7,194,743 B2 * | 3/2007 | Hayton et al. | ............... | 719/315 |
| 2002/0120679 A1 * | 8/2002 | Hayton et al. | ............... | 709/203 |

OTHER PUBLICATIONS

Sun Microsystems Programmers Guide "J2ME Personal Basis Profile, Version 1.0 Java 2 Platform, Micro Edition", Jun. 2002 revised Jul. 10, 2002, XP-002332328.

* cited by examiner

*Primary Examiner*—Meng-Ai An
*Assistant Examiner*—Phuong N. Hoang
(74) *Attorney, Agent, or Firm*—Park, Vaughan & Fleming LLP

(57) ABSTRACT

A system and method for inducing asynchronous behavioral changes in a managed application process is presented. An application manager process is executed. A managed application process is executed. At least one application provided as object-oriented program code under the control of a managed code platform is executed. The managed application process logically communicates with the application manager process. One or more constructors corresponding to notifiable objects provided as object-oriented program code are identified. Each constructor keeps track of instantiated notifiable objects in a list in the managed application process. A change request is broadcast to the managed application process. The notifiable objects tracked by each identified constructor are iterated over to effect a behavioral change in the managed application process.

26 Claims, 6 Drawing Sheets

SYSTEM AND METHOD FOR INDUCING ASYNCHRONOUS BEHAVIORAL CHANGES IN A MANAGED APPLICATION PROCESS

FIELD OF THE INVENTION

The invention relates in general to asynchronous behavioral changes and, in particular, to a system and method for inducing asynchronous behavioral changes in a managed application process.

BACKGROUND OF THE INVENTION

Recent advances in microprocessor design and component integration have enabled a wide range of devices to offer increasingly complex functionality and "soft" features. Soft features include software applications that enhance and customize the operation of a device. These devices include standard computing devices, such as desktop and laptop computers, portable computing devices, such as personal data assistants, and consumer devices, such as cellular telephones, messaging pagers, gaming consoles, and set top boxes. Most devices now include an operating system to support the soft features and other extensions.

The increased capabilities offered by these software-upgradeable devices have also created certain user expectations. Often, users are not technically savvy and are intolerant of performance compromises occasioned by architectural challenges, such as slow or inconsistent application performance. Similarly, users generally expect to be able to access a host of separate applications, which are implemented at the system level through multitasking. For users, widely available software applications assure a positive experience through consistency and increased exposure across multiple platforms. However, for software developers, engineering software applications for disparate computing platforms entails increased development costs and on-going support and upgrade commitments for each supported architecture.

Managed code platforms provide one solution to software developers seeking to support multiple platforms by presenting a machine-independent and architecture-neutral operating environment. Managed code platforms include programming language compilers and interpreters executed by an operating system as user applications, but which provide virtual runtime environments within which compatible applications can operate. For instance, applications written in the Java programming language, when combined with a Java virtual machine (JVM) runtime environment, can operate on heterogeneous computer systems independent of machine-specific environment and configuration settings. An overview of the Java programming language is described in P. van der Linden, "Just Java," Ch. 1, Sun Microsystems, Inc. (2d ed. 1997), the disclosure of which is incorporated by reference. JVMs are a critical component to the overall Java operating environment, which can be ported to the full range of computational devices, including memory-constrained consumer devices.

Managed code platforms are generally designed for the monotonic execution of a single application instance. The combination of a managed code platform and an application instance forms an application process. Thus, multiple application processes can be executed to simulate multitasking behavior for a plurality of individual applications. Each "multitasked" application executes under a separate managed code platform, which provides a discrete virtual runtime environment. In turn, each managed code platform executes in a separate process space under the control of the underlying operating system. Limited control over managed code platforms can be effected using facilities provided by the operating system, such as inter-process communication (IPC) and related mechanisms, such as signal handlers, but similar facilities are generally not available for controlling applications executing under managed code platforms.

Application control is unavailable for several reasons. First, each application can originate from a different source and can be programmed using different application models, programming languages and operational assumptions. As well, each application is isolated within the virtual runtime environment provided by the managed code platform and inter-process control must be explicitly programmed into an application using extended library functions operating within the runtime environment. Such program extensions are often slow and can potentially introduce compatibility and interoperability issues. Moreover, isolated application execution is generally preferred over cooperative application execution for simplicity, robustness and efficiency.

Nevertheless, an application manager is frequently used to provide a minimal degree of centralized control over multiple application processes executing on a device, especially consumer devices, based on user requests. However, the control is generally limited to provided large grained control over application startup and termination. Fine grained control over application-level behavioral characteristics is unsupported due to the unavailability of application control facilities. For example, application properties or the look and feel of the user interface might need to be dynamically changed by the runtime environment or to ensure a consistence appearance and user experience. However, the lack of inter-application control facilities precludes making such runtime changes.

Therefore, there is a need for an approach to providing dynamic centralized control over isolated application processes. Preferably, such an approach would effect asynchronous changes over each application process without effecting discrete application execution. Moreover, such an approach would further provide a flexible mechanism to communicate behavioral changes while allowing each application process to proceed without explicit cooperation.

SUMMARY OF THE INVENTION

An application manager and a managed code platform are executed in an application framework that supports the spawning of multiple and independent isolated user applications. The managed code platform includes a runtime system process, such as a virtual machine, to interpret machine-portable code defining compatible applications. Each executing application and runtime system process pairing constitutes a managed application process. The application manager asynchronously accesses the runtime system process through a listener implementing an inter-process communication (IPC) mechanism, such as a dedicated control thread. An instance of this listener resides in the address space of each managed application process. The listener is accessible by the application manager via a "handle." For example, TCP/IP can be used as the IPC mechanism between the application manager and managed application processes and the handle is specified as a TCP port number. The runtime system process context includes a set of notifiable objects, which are used to transparently impose behavioral changes on applications executing in the runtime system process. An example of a suitable managed code platform and managed application process are the Java operating environment and Java virtual machine (JVM) architecture, as licensed by Sun Microsystems, Inc., Palo Alto, Calif.

One embodiment provides a system and method for inducing asynchronous behavioral changes in a managed application process. An application manager process is executed. A managed application process is executed. At least one application provided as object-oriented program code under the control of a managed code platform is executed. The managed application process logically communicates with the application manager process. One or more constructors corresponding to classes of notifiable objects are identified. Each such constructor, when executed, puts a newly constructed notifiable object of interest on a list. A change request is broadcast to the managed application process. The notifiable objects transparently tracked by the constructors are iterated over to effect a behavioral change in the managed application process.

Behavioral changes are performed transparently to non-cooperating applications executing in a runtime system process as part of a managed application process. Using the listener and transparently tracked notifiable objects, behavioral changes can be effected by an application manager on executing managed application processes independently of and without the express cooperation of the discrete executing application.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
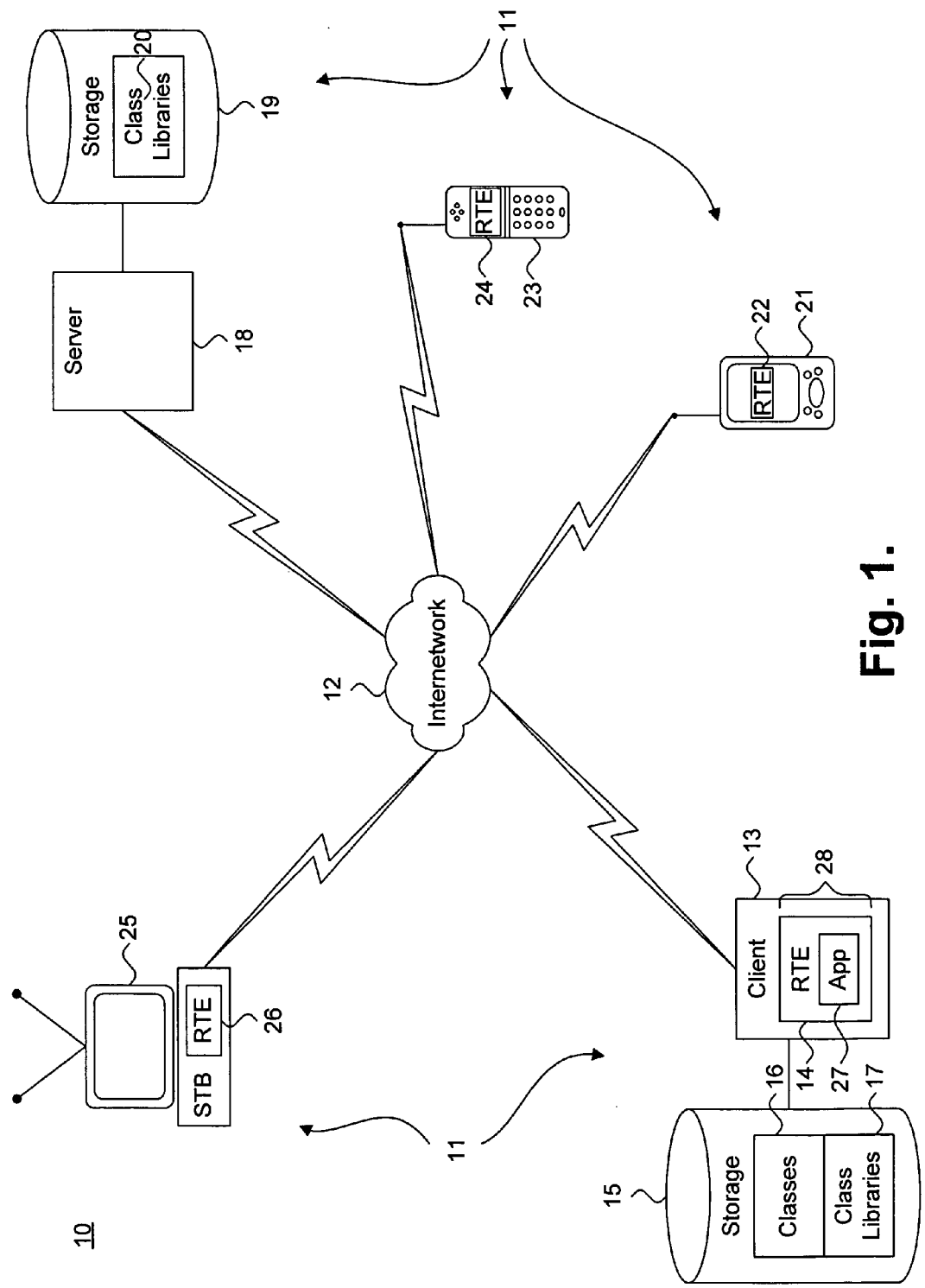
FIG. 1 is a functional block diagram showing, by way of example, runtime environments implemented on a plurality of heterogeneous devices.

FIG. 1 is a functional block diagram 10 showing, by way of example, runtime environments (RTEs) 14, 22, 24, 26 implemented on a plurality of heterogeneous devices 11. Each heterogeneous device 11 provides a managed code platform, such as the Java operating environment, executing in a runtime environment 14, 21, 24, 26. One or more applications 27 can execute in the runtime environments 14, 21, 24, 26 and each executing application 27 and runtime environment 14, 21, 24, 26 pairing constitutes a managed application process 28, as further described below with reference to FIG. 2. The heterogeneous devices 11 include, nonexclusively, a client computer system 13, such as a desktop or laptop computer system. Each client 13 is operatively coupled to a storage device 15 and maintains a set of classes 16 and class libraries 17, which respectively define code modules that specify data structures and sets of methods that operate on the data, and shareable collections of the modules. The heterogeneous devices 11 also include portable computing devices, including personal data assistants 21, and consumer devices, such as cellular telephones 23 and set top boxes (STB) 25. Finally, a server 18 is operatively coupled to a storage device 19 in which globally shareable class libraries 20 are maintained. Each of the heterogeneous devices 11 can interface via a network 12, which includes conventional hardwired and wireless network configurations. Other types of heterogeneous devices 11 and various network configurations, arrangements, and topologies are possible.

Each heterogeneous device 11 includes an operating system to manage resources, provide access to peripheral devices, allocate memory resources, and control program execution and termination. In one embodiment, each operating system supports a process cloning mechanism that spawns multiple and independent isolated user applications by cloning the memory space of specifiable processes, such as described in commonly-assigned U.S. patent application Ser. No. 10/745,023, entitled "System And Method For Dynamic Preloading Of Classes Through Memory Space Cloning Of A Master Runtime System Process," filed 22 Dec. 2003, pending; Ser. No. 10/745,020, entitled "System And Method For Providing Precompiled Code Through Memory Space Cloning Of A Master Runtime System Process," filed 22 Dec. 2003, pending; and Ser. No. 10/745,021, entitled "System And Method For Eliminating Static Initialization Overhead By Memory Space Cloning Of A Master Runtime System Process," filed 22 Dec. 2003, issued 17 Oct. 2006, U.S. Pat. No. 7,124,291; the disclosures of which are incorporated by reference. An example of a process cloning mechanism suitable for use in the present invention is the fork( ) system call provided by the Unix or Linux operating systems, such as described in M. J. Bach, "The Design Of The Unix Operating System," Ch. 7, Bell Tele. Labs., Inc. (1986), the disclosure of which is incorporated by reference. The process invoking the fork( ) system call is known as the parent process and the newly created process is called the child process. The operating system assigns a separate process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

System for Inducing Asynchronous Behavioral Changes

Figure 2:
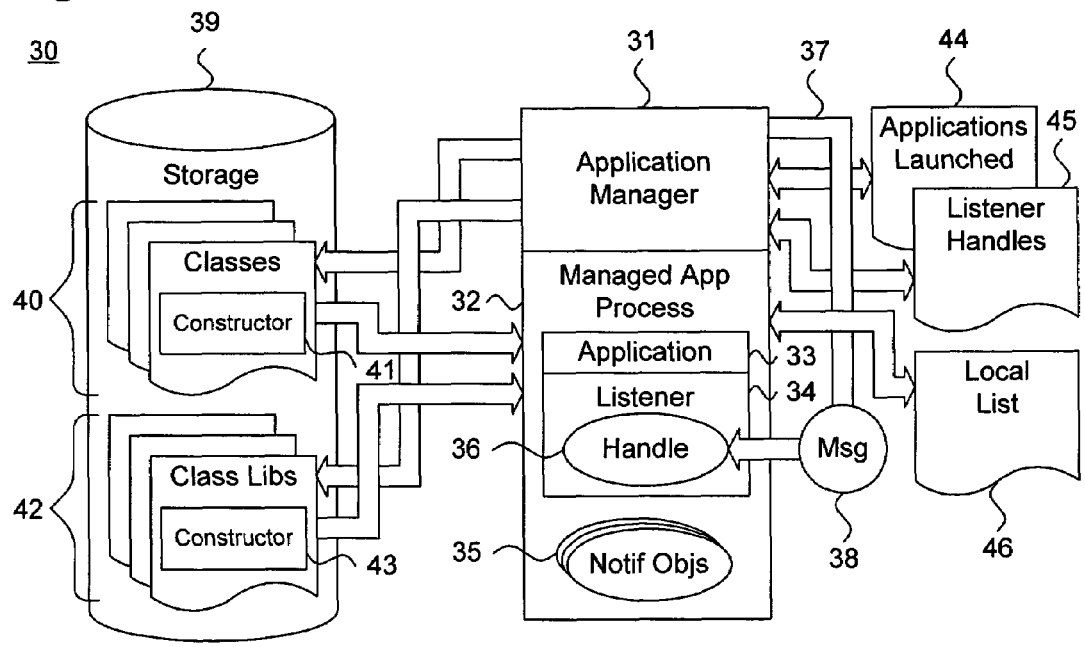
FIG. 2 is a block diagram showing a system for inducing asynchronous behavioral changes in a managed application process, in accordance with the invention.

FIG. 2 is a block diagram showing a system 30 for inducing asynchronous behavioral changes in a managed application process 34, in accordance with the invention. The system 30 includes a runtime environment executing an application manager 31 and one or more managed application processes 32. The managed application process 32 includes a managed code platform, such as a Java virtual machine, that interprets machine-portable code defining compatible applications and one or more executing applications 33. A storage device 39 persistently stores individual classes 40 and class libraries 42 that form the overall core managed code platform. By way of example, the system is described with reference to the Java operating environment, although other forms of managed code platforms that execute applications preferably written in an object oriented programming language, such as the Java programming language, could also be used.

The application manager 31 presents a user interface through which individual applications can be selected and executed by a user. At runtime, the application manager 31 is communicatively interfaced to the managed application process 32 through a listener 34. The application manager 31 induces behavioral changes in the application 33 indirectly through a combination of the listener 34 and one or more notifiable objects 35 instantiated in the managed application process context and transparently tracked in lists by their constructors.

The listener 34 provides a logical communication channel from the application manager 31 through which behavioral changes can be asynchronously "broadcast" in a message ("Msg") 38 to one or more managed application processes 32. The application manager 31 records launched managed application processes 32 in an applications launched list 44. Upon initiating a behavioral change, the application manager 32 iterates over the applications launched list 44 and sends the same message 38 to the listeners 34 of all spawned managed application processes 32. The message 38 identifies the nature of the change request, such as changing application properties or the look and feel of the user interface. Other types of change requests are possible.

The application manager 31 accesses each managed application process 32 through a handle 36 defined on the listener 34. The application manager 31 records listener handles 36 in a listener handles list 45. The listener 34 resides in the address space of the managed application process 31 and includes a dedicated control thread that remains inactive until a change is requested by the application manager 31, as further described below with reference to FIG. 5. In the described embodiment, the listener 34 is provided through an IPC mechanism, such as a TCP, and includes a handle 36 defined as a socket, such as a TCP socket, which can be specified as a dedicated port number on the managed application process 32.

The notifiable objects 35 are instantiated in the context of the managed code platform of the managed application process 32. Constructors 41, 43 for the notifiable objects 35 are defined in the classes 40 and classes defined in the class libraries 42. The managed application process 32 uses the constructors 41, 43 for the types of notifiable objects 35 to put each instantiated notifiable object 35 into a local list 46 in the managed application process 31. These constructors 41, 43 are architected into the classes 40, 42 to include functionality necessary to accommodate such tracking. The classes 40, 42 continue to meet programming model expectations, but are supplemented with the additional tracking and change functionality. For example, certain well-known libraries are often used by applications 33 and the implementation of the source code required to define the libraries are generally specified as a system class, rather than an application class. Accordingly, the libraries can be written to both provide the expected functionality and also include functionality to track notifiable objects 35 in lists 46, thereby allowing behavioral changes to occur transparently relative to application execution. In a further embodiment, each class 40, 42 also defines a finalizer that can detect the eligibility of notifiable objects 35 for garbage collection. The finalizer method can then remove the notifiable object 35 from the respective tracking list, since the notifiable object 35 is about to be reclaimed by the garbage collector.

To initiate a behavioral change, the application manager 31 sends a message 38 identifying the type of notifiable object 35 required to effect the behavioral change. The listener 34 then iterates over allocated notifiable objects 35 of the identified type as tracked in the local list 46 and transparently effects the behavioral change on behalf of the application manager 31.

Asynchronous Control and Data Exchange

Figure 3A:
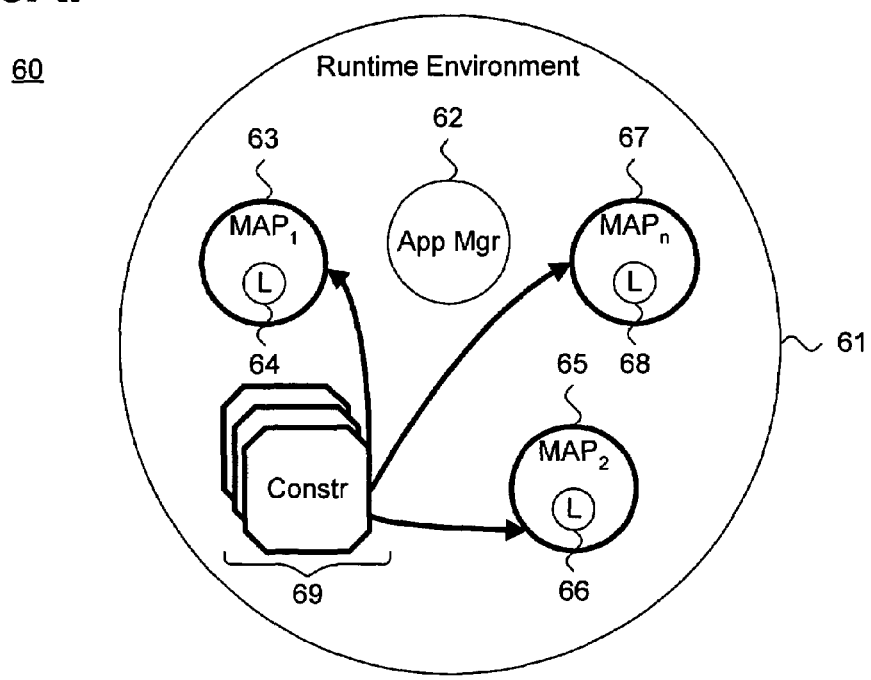
FIGS. 3A-C are functional block diagrams showing, by way of example, an asynchronous control and data exchange between an application manager and a plurality of managed application processes.
Figure 3B:
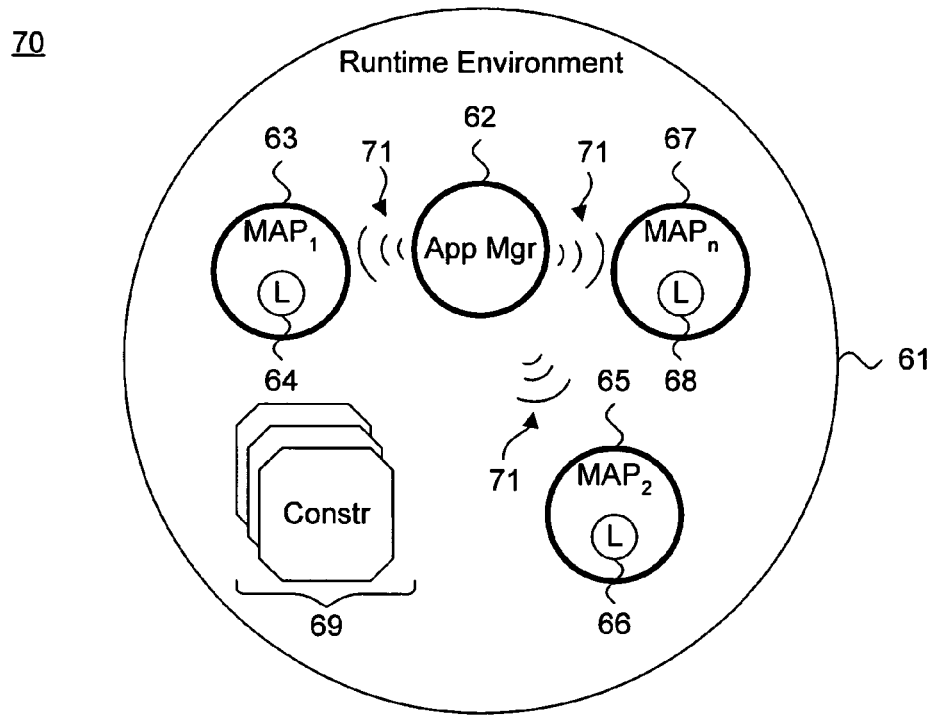
Figure 3C:
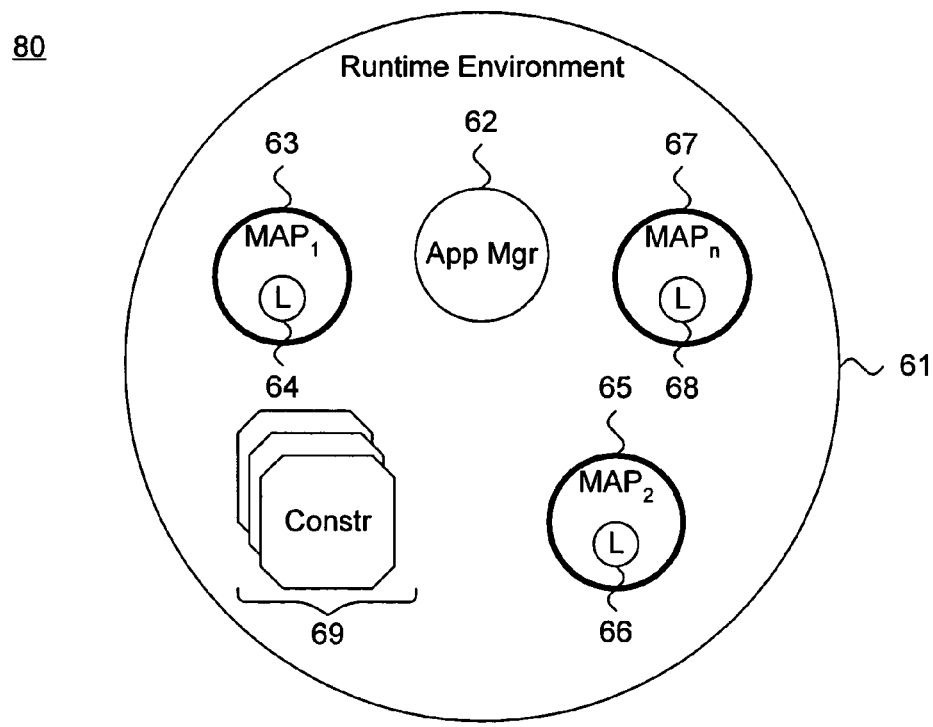

FIGS. 3A-C are functional block diagrams 60, 80, 90 showing, by way of example, an asynchronous control and data exchange between an application manager 62 and a plurality of managed application processes 63, 65, 67. The application manager 62 and managed application processes 63, 65, 67 all execute within a runtime environment 61. Referring first to FIG. 3A, each managed application process 63, 65, 67 uses the constructors 69 corresponding to the type of notifiable objects to track notifiable objects into a local list.

Referring next to FIG. 3B, the application manager 62 begins inducing behavioral changes by transferring a message 38 to each of the managed application processes 63, 65 67 through an asynchronous "broadcast" 71, which is received by a listener ("L") 64, 66, 68 implemented in each managed application process 63, 65, 67. The broadcast 71 serves two functions. First, the broadcast 71 notifies each managed application process 63, 65, 67 that the application manager 62 is requesting a behavioral change. Second, the broadcast 71 identifies the type of behavioral change requested. By way of example, the change could effect properties or look and feel characteristics of each managed application process 63, 65, 67. Other types of changes are possible.

Referring last to FIG. 3C, the individual managed application processes 63, 65, 67 implement the requested behavioral changes. The type of actions taken by each managed application process 63, 65, 67 depend upon the code defining each notifiable object 69. The listener 64, 66, 68 is responsible for finding each set of tracked notifiable objects in the corresponding address space of each managed application process 63, 65, 67 and iterating over the notifiable objects to effect the behavioral change. Other types of actions are possible.

Method for Inducing Asynchronous Behavioral Changes

Figure 4:
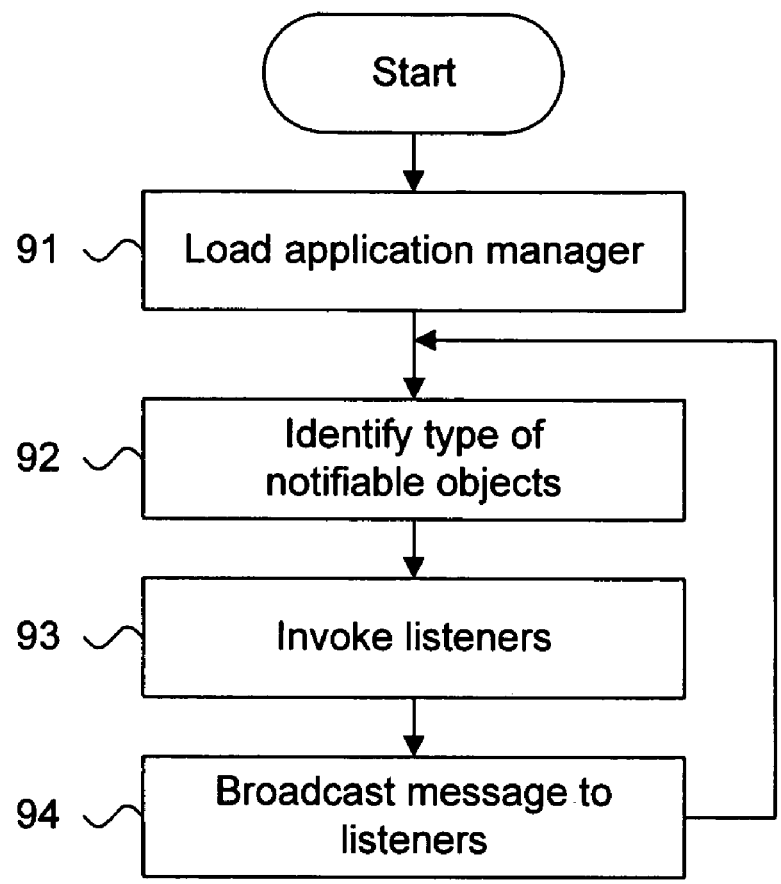
FIG. 4 is a flow diagram showing a method for inducing asynchronous behavioral changes in a managed application process, in accordance with the invention.

FIG. 4 is a flow diagram, showing a method 90 for inducing asynchronous behavioral changes in a managed application process, in accordance with the invention. The method 100 is described as a sequence of process operations or steps, which can be executed, for instance, by the runtime environment 31 of FIG. 2 or other components.

Initially, the application manager 31 is loaded (block 91). When initiating an induced behavioral change, the application manager 31 identifies the type of notifiable objects 35 required to effect the behavioral change (block 92). The application manager 31 then invokes the listeners 34 of all of the spawned managed application processes 32 through the handle 36 respectively defined on each managed application process 32 (block 93). A message 38 describing the behavioral change is then broadcast to the managed application processes 32 (block 94). Processing continues indefinitely until the application manager 31 is terminated.

Routine for Executing a Managed Application Process

Figure 5:
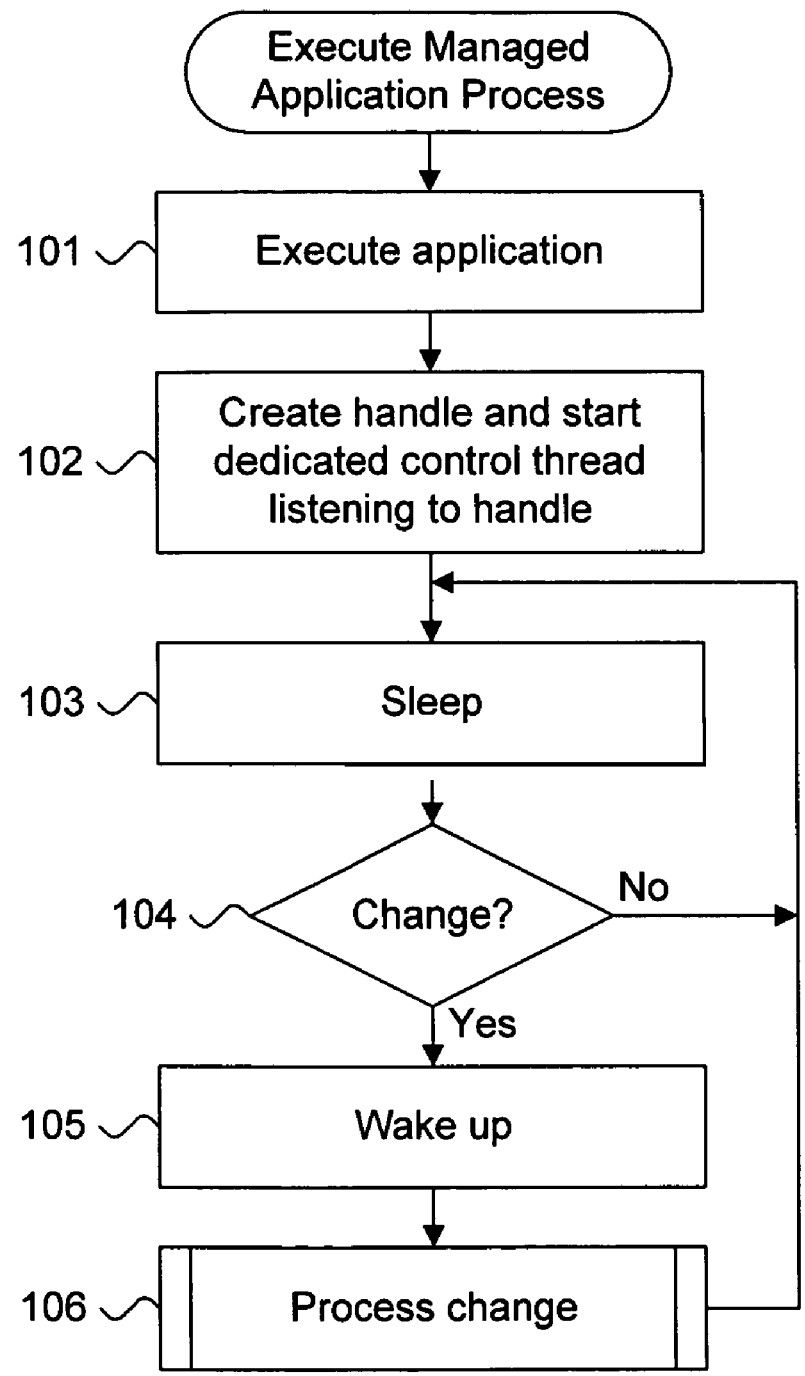
FIG. 5 is a flow diagram showing the routine for executing a managed application process for use in the method of FIG. 4.

FIG. 5 is a flow diagram showing the routine 100 for executing a managed application process 32 for use in the method 90 of FIG. 4. One purpose of this routine is to initiate an asynchronous behavioral change in response to a change request received from an application manager 31.

Initially, an application 33 is executed by the managed code platform of the managed application process 32 (block 101). A handle 36 is created and a dedicated control thread is started in the managed application process 32 listening to the handle 31 (block 102). The control thread immediately enters an inactive sleep mode (block 103). Upon receiving a change request from the application manager 32 (block 104), the control thread awakens (block 105) and processes an induced behavioral change (block 106), as further described below with reference to FIG. 6. Processing continues indefinitely until the managed application process 32 is terminated.

Routine for Processing a Change

Figure 6:
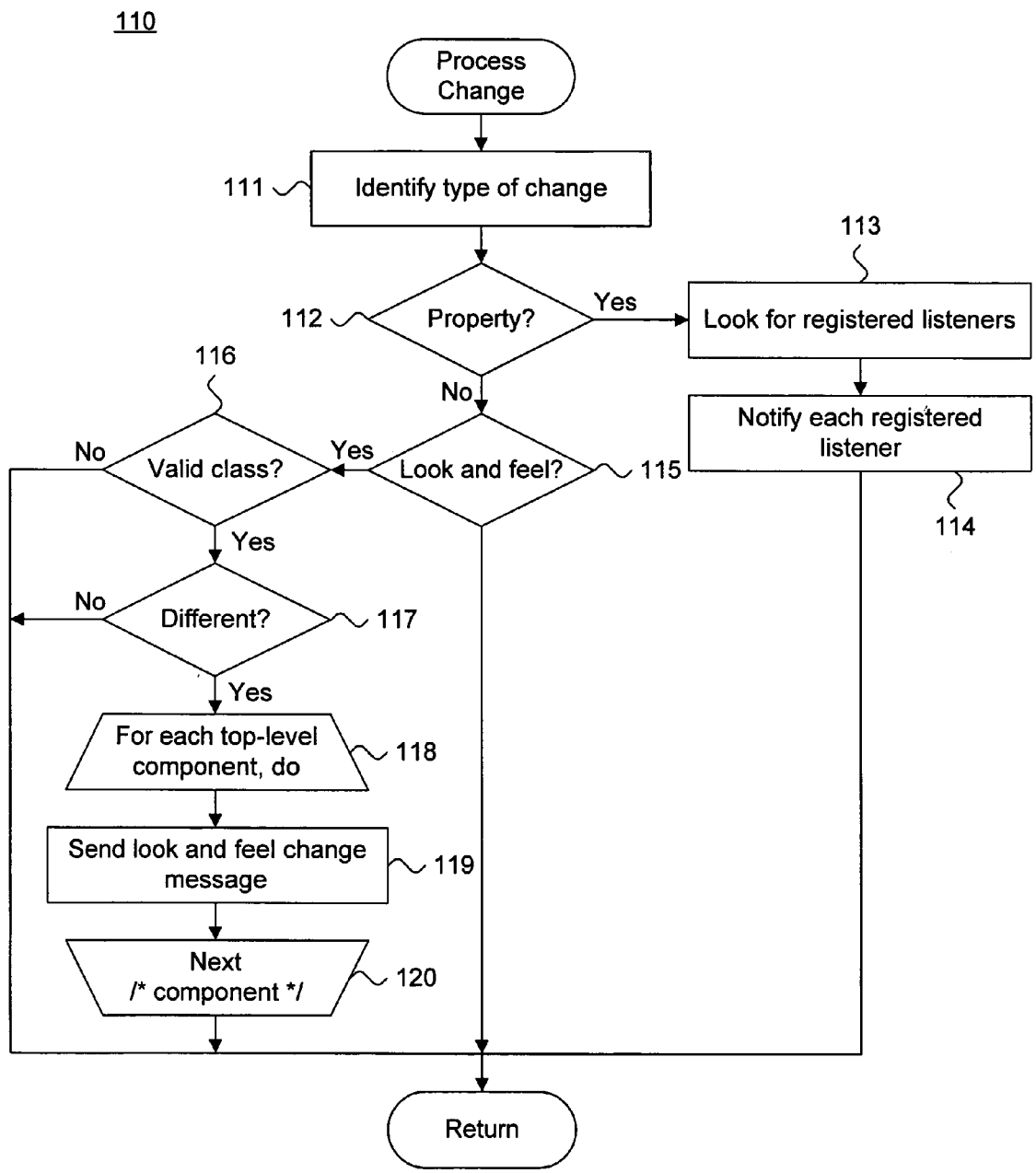
FIG. 6 is a flow diagram showing, by way of example, the routine for processing an induced asynchronous behavioral change for use in the routines of FIG. 5.

FIG. 6 is a flow diagram showing, by way of example, the routine 110 for processing an induced asynchronous behavioral change for use in the routine 100 of FIG. 5. One purpose of this routine is to effect a behavioral change on a managed application process 32 through execution of notifiable objects 35. The execution is triggered by the listener 34 when the listener 34 receives a message 38 broadcast from the application manager 31. The listener 34 is then responsible for finding each set of notifiable objects 35 in the corresponding address space of the managed application process 32 and iterating over the notifiable objects 35 to effect the behavioral change Initially, the type of requested behavioral change is identified (block 111). In one embodiment, a change to a property of the managed application process 32 can be effected (block 112) by identifying (block 113) and notifying one or more registered property change listeners (block 114).

In a further embodiment, a change to a look and feel characteristic of a user interface of the managed application process 32 can be effected (block 116). If the requested change identifies a valid look and feel class (block 116) and the class is different than the current look and feel class (block 117), a look and feel behavioral change is necessary. The managed application process 32 iterates (blocks 118-120) over each registered top-level user interface component and sends a look and feel change message (block 119). The change is then effected in a manner appropriate to the toolkit in use. For example, the change could be enqueued to temporarily defer execution or could be executed immediately. Following effecting changes, the routine then returns.

By way of example, if the message 38 sent by the application manager 32 includes "PROPERTY_CHANGE propertyName=value," the listener 34 identifies those property change listeners registered for <propertyName> and notifies each property change listener using a property changed( ) call.

By way of further example, if the message 38 sent by the application manager 32 includes "LANDF_CHANGE lookAndFeelClassName," the listener 34 determines whether <lookAndFeelClassName> is valid and different from the current look and feel. If a change is necessary, the listener 34 iterates over all registered top-level user interface components and sends a look and feel change message. Other types of behavioral changes are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for inducing asynchronous behavioral changes in a managed application process, comprising:
   a processor;
   a memory;
   a managed application process, comprising:
      at least one application being provided as object-oriented program code under the control of a managed code platform; and
      a handle to logically communicate with an executing application manager process;
   a local list to identify one or more constructors corresponding to notifiable objects provided as object-oriented program code, wherein the constructors include functionality for tracking the notifiable objects and functionality for specifying eligibility of the notifiable objects for garbage collection;
   an application manager to asynchronously broadcast a message to induce behavioral changes in the managed application process;
   at least one dedicated control thread to listen to the handle for a change request, wherein the control thread remains in an inactive sleep mode and awakens when receiving a change request from the application manager; and
   a listener to find and iterate over the notifiable objects tracked by each identified constructor to effect a behavioral change in the managed application process,
   thereby facilitating the asynchronous behavioral changes in the managed application process.

2. A system according to claim 1, wherein information is communicated from the application manager in a stream defined on the control thread.

3. A system according to claim 2, wherein the handle comprises a TCP socket and the stream comprises a TCP stream.

4. A system according to claim 1, further comprising:
   at least one property associated with the at least one application changed through the at least one such notifiable object.

5. A system according to claim 4, further comprising:
   at least one property change listener to specify the at least one property change.

6. A system according to claim 5, further comprising:
   the at least one property change listener to be notified relative to receiving the change request.

7. A system according to claim 4, further comprising:
   at least one look and feel characteristic associated with the at least one application to be changed through the at least one such notifiable object.

8. A system according to claim 7, further comprising:
   at least one registered top-level user interface component to specify the at least one look and feel characteristic change.

9. A system according to claim 8, wherein the listener iterates over each at least one registered top-level user interface component relative to receiving the change request.

10. A system according to claim 9, wherein completion of the at least one look and feel characteristic change is effected, comprising at least one of:
    a queue to enqueue the at least one registered top-level user interface component relative to receiving the change request to temporarily defer execution; and
    a process thread to immediately execute the at least one registered top-level user interface component relative to receiving the change request.

11. A system according to claim 1, wherein the object-oriented program code is written in the Java programming language.

12. A system according to claim 1, wherein the managed code platform is a Java virtual machine.

13. A method for inducing asynchronous behavioral changes in a managed application process, comprising:
- executing an application manager process to asynchronously broadcast a message to induce behavioral changes in the managed application process;
- executing a managed application process, comprising:
  - executing at least one application provided as object-oriented program code under the control of a managed code platform; and
  - logically communicating with the application manager process by the use of a handle;
- identifying one or more constructors corresponding to notifiable objects provided as object-oriented program code, wherein the constructors include functionality for tracking the notifiable objects and functionality for specifying eligibility of the notifiable objects for garbage collection;
- listening to the handle for a change request through a dedicated control thread, wherein the control thread remains in an inactive sleep mode and awakens when receiving a change request from the application manager; and
- finding and iterating over by a listener the notifiable objects tracked by each identified constructor to effect a behavioral change in the managed application process,
- thereby facilitating the asynchronous behavioral changes in the managed application process.

14. A method according to claim 13, further comprising:
communicating information from the application manager in a stream defined on the control thread.

15. A method according to claim 14, wherein the handle comprises a TCP socket and the stream comprises a TCP stream.

16. A method according to claim 13, further comprising:
changing at least one property associated with the at least one application through the at least one such notifiable object.

17. A method according to claim 16, further comprising:
specifying the at least one property change as at least one property change listener.

18. A method according to claim 17, further comprising:
notifying the at least one property change listener relative to receiving the change request.

19. A method according to claim 16, further comprising:
changing at least one look and feel characteristic associated with the at least one application through the at least one such notifiable object.

20. A method according to claim 19, further comprising:
specifying the at least one look and feel characteristic change as at least one registered top-level user interface component.

21. A method according to claim 20, further comprising:
iterating over each at least one registered top-level user interface component relative to receiving the change request.

22. A method according to claim 21, further comprising:
effecting completion of the at least one look and feel characteristic change, comprising at least one of:
- enqueuing the at least one registered top-level user interface component relative to receiving the change request to temporarily defer execution; and
- immediately executing the at least one registered top-level user interface component relative to receiving the change request.

23. A method according to claim 13, wherein the object-oriented program code is written in the Java programming language.

24. A method according to claim 13, wherein the managed code platform is a Java virtual machine.

25. A computer-readable storage medium holding code that when executed by a processor cause the processor to perform a method for inducing asynchronous behavioral changes in a managed application process, the method comprising:
- executing an application manager process to asynchronously broadcast a message to induce behavioral changes in the managed application process;
- executing a managed application process, comprising:
  - executing at least one application provided as object-oriented program code under the control of a managed code platform; and
  - logically communicating with the application manager process by the use of a handle;
- identifying one or more constructors corresponding to notifiable objects provided as object-oriented program code, wherein the constructors include functionality for tracking the notifiable objects and functionality for specifying eligibility of the notifiable objects for garbage collection;
- listening to the handle for a change request through a dedicated control thread, wherein the control thread remains in an inactive sleep mode and awakens when receiving a change request from the application manager; and
- finding and iterating over by a listener the notifiable objects tracked by each identified constructor to effect a behavioral change in the managed application process,
- thereby facilitating the asynchronous behavioral changes in the managed application process.

26. An apparatus having a processor for inducing asynchronous behavioral changes in a managed application process, comprising:
- means for executing an application manager process to asynchronously broadcast a message to induce behavioral change in the managed application process;
- means for executing a managed application process, comprising:
  - means for executing at least one application provided as object-oriented program code under the control of a managed code platform; and
  - means for logically communicating with the application manager process by the use of a handle;
- means for identifying one or more constructors corresponding to notifiable objects provided as object-oriented program code, wherein the constructors include functionality for tracking the notifiable objects and functionality for specifying eligibility of the notifiable objects for garbage collection;
- a means for listening to the handle for a change request through a dedicated control thread, wherein the control thread remains in an inactive sleep mode and awakens when receiving a change request from the application manager; and
- means for iterating over by a listener the notifiable objects tracked by each identified constructor to effect a behavioral change in the managed application process,
- thereby facilitating the asynchronous behavioral changes in the managed application process.

* * * * *